United States Patent [19]
Björkholm

[11] Patent Number: 5,857,560
[45] Date of Patent: Jan. 12, 1999

[54] TRANSPORTING MEANS, METHOD AND ARRANGEMENT FOR PRODUCING TRANSPORT MEANS

[76] Inventor: Lars Björkholm, Svensgärdesgatan 74B, Brähult, Sweden, S-510 54

[21] Appl. No.: 635,895

[22] PCT Filed: Oct. 28, 1994

[86] PCT No.: PCT/SE94/01019

§ 371 Date: Jul. 3, 1996

§ 102(e) Date: Jul. 3, 1996

[87] PCT Pub. No.: WO95/11849

PCT Pub. Date: May 4, 1995

[30] Foreign Application Priority Data

Oct. 28, 1993 [SE] Sweden ................................ 9303552

[51] Int. Cl.$^6$ .................................................. B65G 15/16
[52] U.S. Cl. .......................... 198/837; 198/841; 198/816
[58] Field of Search ...................... 198/813, 816, 198/837, 839, 841

[56] References Cited

U.S. PATENT DOCUMENTS

| | | | |
|---|---|---|---|
| 2,633,226 | 3/1953 | Vogt . | |
| 3,332,538 | 7/1967 | Rice | 198/816 X |
| 3,910,404 | 10/1975 | Hensekson | 198/841 X |
| 4,207,838 | 6/1980 | Pirovano | 198/837 X |
| 4,967,669 | 11/1990 | Kuchta | 198/816 X |

FOREIGN PATENT DOCUMENTS

| | | | |
|---|---|---|---|
| 2059941 | 6/1971 | France . | |
| 939798 | 7/1949 | Germany | 198/841 |
| 2841000 | 4/1980 | Germany . | |
| 257810 | 11/1986 | Japan | 198/837 |
| 8802626 | 1/1990 | Sweden . | |
| 1576275 | 10/1980 | United Kingdom . | |
| 2125758 | 3/1984 | United Kingdom . | |

*Primary Examiner*—James R. Bidwell
*Attorney, Agent, or Firm*—Lerner, David, Littenberg, Krumholz & Mentlik

[57] ABSTRACT

A guiding device is disclosed for a conveyor chain for transporting objects adapted to be carried by load-carriers which are connected or connectable to the conveyor chain, which is formed by a plurality of carrier elements arranged in a row and a connector for connecting the carrier elements to each other so that the chain may be deflected simultaneously both vertically and laterally. The guiding device comprises a channel including grooves in which the conveyor chain is intended to run and an inwardly facing sliding surface for guiding the conveyor chain, the inwardly facing sliding surface is adapted to the cross-sectional shape of the carrier elements, and the guiding device further includes a profile beam enclosing the channel, and including a longitudinal slot opening outwardly whereby the load-carriers connected to the conveyor chain are carried thereby, and the inwardly facing sliding surface comprises a plurality of slide elements including strip protrusions extending into the grooves in the channel.

11 Claims, 8 Drawing Sheets

TRANSPORTING MEANS, METHOD AND ARRANGEMENT FOR PRODUCING TRANSPORT MEANS

FIELD OF THE INVENTION

The present invention relates to a conveyor

The present invention also relates to a method and a device for production of a conveyor in accordance with the preamble of appended claims.

The object of the present invention is to provide a conveyor by means of which an even and regular movement of the carrier elements is provided with low friction.

SUMMARY OF THE INVENTION

In accordance with the present invention, these and other objects have been realized by the invention of a guiding device for a conveyor chain for the transport of objects adapted to be carried by load-carriers which are connected or connectable to said conveyor chain, wherein said conveyor chain is formed by a plurality of carrier elements arranged in a row and connection means adapted to connect said carrier elements to each other so that said chain may be deflected simultaneously both vertically and laterally, said guiding device comprising a channel including grooves in which said conveyor chain is intended to run and an inwardly facing sliding surface for guiding said conveyor chain, said inwardly facing sliding surface adapted to the cross-sectional shape of said carrier elements, said guiding device further including a profile beam enclosing said channel, said profile beam including a longitudinal slot opening outwardly whereby said load-carriers connected to said conveyor chain are carried thereby, said inwardly facing sliding surface comprising a plurality of slide elements including strip protrusions extending into said grooves in said channel.

In accordance with another embodiment of the present invention, a conveyor is provided comprising a guiding device and a conveyor chain for the transport of objects along a path, wherein the objects are adapted to be carried by load-carriers which are connected or connectable to the conveyor chain, the conveyor chain forming a closed, endless loop which is operated by means of a driving device, the conveyor chain comprising a plurality of carrier elements arranged in a row and connection means in the form of a pulling element connecting the plurality of carrier elements to each other so that the chain can be deflected simultaneously both vertically and laterally, the guiding device comprising a channel in which the conveyor chain is intended to run and an inwardly facing sliding surface for guiding the conveyor chain, the inwardly facing sliding surface adapted to the outer circumference of the carrier elements, the guiding device further including a profile beam enclosing the channel, the profile beam including a longitudinal slot opening outwardly whereby the load-carriers connected to the conveyor chain are carried thereby, the pulling element including a plurality of fastening elements for the carrier elements arranged at predetermined intervals thereon, the fastening elements comprising variations in the cross-section of the pulling element, and the carrier elements having an inner surface which corresponds to the cross-section of the pulling element, whereby the carrier elements are closely fastened to the pulling element along the length thereof.

In accordance with another embodiment of the present invention a conveyor is provided comprising a guiding device and a conveyor chain for the transport of objects along a path, wherein the objects are adapted to be carried by load-carriers which are connected to or connectable with the conveyor chain, the conveyor chain forming a closed, endless loop which is operated by means of a driving device, the conveyor chain comprising a plurality of carrier elements arranged in a row and connection means in the form of a pulling element connecting the plurality of carrier elements to each other so that the chain can simultaneously be deflected both vertically and laterally, the guiding device comprising a channel in which the conveyor chain is intended to run and an inwardly facing sliding surface for guiding the conveyor chain, the inwardly facing sliding surface adapted to the outer circumference of the carrier elements, the guiding device further including a profile beam enclosing the channel, the profile beam including a longitudinal slot opening outwardly whereby the load-carriers connected to the conveyor chain are carried thereby, the profile beam comprising an adjustable tensioning device along at least a section of the guiding device, whereby the adjustable tensioning device controls the length of the guiding device, the adjustable tensioning device comprising a first guide and a second guide meshing with the first guide to form an integrated part of the profile beam, one of the first and second guides including finger-like protrusions and the other of the first and second guides including corresponding tracks for engaging the finger-like protrusions.

BRIEF DESCRIPTION OF THE DRAWINGS

The invention will be described in the following in greater detail by way of some embodiments and with reference to the annexed drawings, in which.

DETAILED DESCRIPTION OF THE INVENTION

Figure 1:
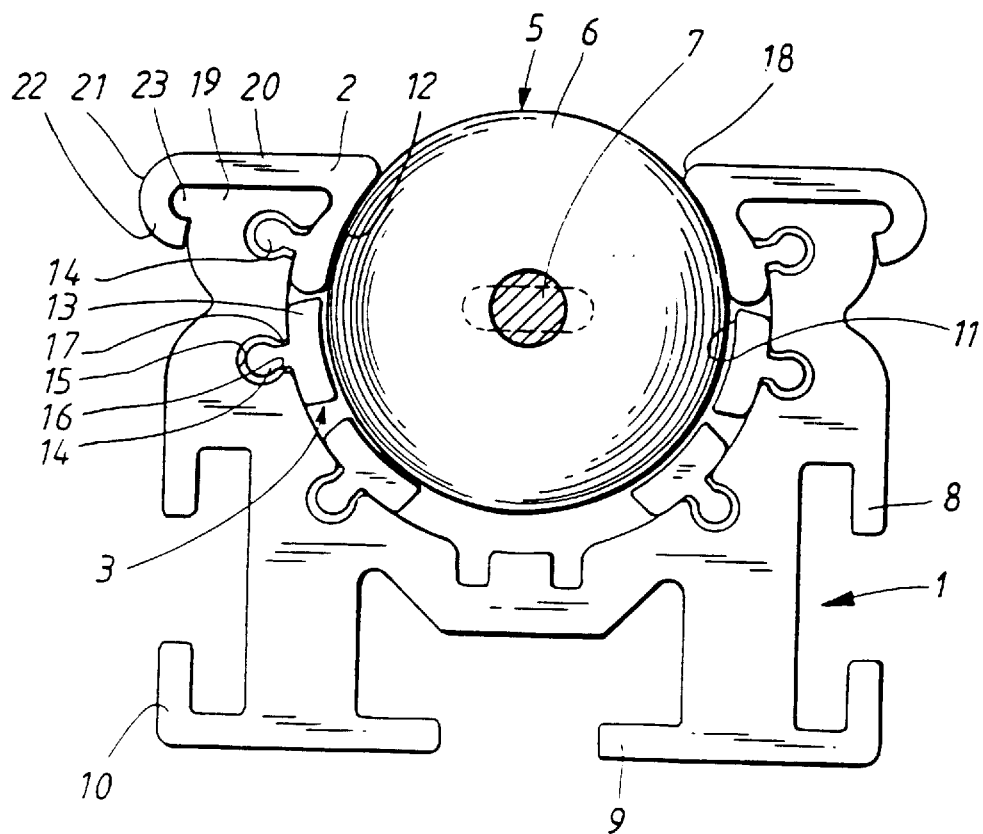
FIG. 1 shows an end view of a guiding device in which a conveyor chain according to the invention is provided.

The conveyor in accordance with the invention comprises a conveyor chain which, together with a guiding device, may convey objects along a path which is determined by the extension of the carrier device. The guiding device mainly comprises a profile beam 1 of, for example, continuously cast aluminium or aluminium alloy and several, in the shown example six, slide elements 2, 3 in the form of strips which are arranged on the profile beam. The beam comprises a bottom strip which is formed in the profile and which is intended to form a channel together with the strips 2, 3, which channel acts as a guide for the conveyor chain 5, which is shown together with an example in FIGS. 1 and 2. In the shown example, the conveyor chain is made up of rotationally symmetrical carrier elements 6 with pulling elements, i.e. with connecting means 7 in the form of a cord or wire extending through the carrier elements. The conveyor chain is intended to be operated by a not shown driving device and to carry with it not shown load-carrying devices which can be of different types and which can be connected to the carrier elements in different ways, by means of direct fastening or form engagement with the carrier elements, and thus with a section being adapted to the calotte shape of the carrier elements or being interposed between the carrier elements. On its outside, the profile beam presents several flanges 8, 9, 10 for enclosing longitudinal channels for connection of not shown consoles in an arrangement. In this regard, the profile beams are manufactured in suitable lengths or are entirely tailor-made for each particular arrangement. The profile beam and thus also the slide elements or the slide strips may be forced to deflect both laterally and vertically, which deflection can be carried out simultaneously.

The slide elements 2, 3 are manufactured from a suitable material which is temperature-resistant and which has a high mechanical strength, for example against wear, and which also has low friction on its sliding surfaces 11, 12. One type of slide element 3 is positioned entirely in the channel 4 and presents an essentially T-shaped cross-section in which an outwardly facing surface of the cross piece is adapted to the contour shape of the carrier elements' contour shape which is arcuate, whereby the slide elements which extend longitudinally and which extend in the longitudinal direction of the profile beam form a section of a cylinder mantle surface. The radius of curvature is chosen essentially the radius of curvature of the contour shape of the carrier elements. Furthermore, each of the slide elements 3 presents a strip-shaped protrusion 14 which extends into grooves 15 in the channel. The grooves extend radially into the profile beam and present a "keyhole" shape, i.e. they present a narrow section 16 towards the surface of the channel. The strip-shaped protrusions also present a narrow neck section 17, by means of which the slide elements 3 are held in corresponding grooves 15, either by being snapped into the grooves, provided that a certain elasticity is provided in the material of the slide elements, or that they are slid into the grooves from either end of the profile beam. In the bottom of the channel, grooves 15 are provided, e.g. two in number, which form draining and gathering grooves for foreign particles, water, oil, etc. The grooves are advantageously provided at certain intervals with draining holes through the bottom.

The other type of slide element 2, of which two are provided, is located in connection with the longitudinally extending slit opening 18 of the channel and extends around the two edge sections 19 of the profile beam which enclose the slit opening. The slide elements 2 also present said strip-shaped protrusions 14 which have the same form and properties so that the slide elements are retained in the corresponding groove 15. The two slide elements 2 present a form which is specially adapted to its purpose and which is divided into at least two, or as in the shown example three, specially adapted surface sections, that is, a first surface section which forms said sliding surface 12 for the conveyor chain. This surface section is designed in the same way as the sliding surface 11 for the other type of slide element 3 and thus has the shape of a section of a cylinder mantle surface. A second surface section 20 is plane and is outwardly facing, in the shown example upwards, and forms a sliding surface for load-carriers or possibly for goods being transported by means of the conveyor chain. A third surface section 21, which in the shown example is outwardly convex and which extends laterally, forms a sliding surface for a special type of load-carrier, namely hanging load-carriers which present a hanging section which is supported against the third surface section. This surface section forms part of a snap-on section 22 which is intended to be snapped on around a bead-shaped section 23 of the edge section 19 of the profile beam, through which the slide elements 2 are essentially retained along both its end edges, that is by means of the strip-shaped protrusion 14 and also by means of the snap-on section 22.

In accordance with the invention, the conveyor chain is arranged so that the carrier elements 6 are arranged in a non-slidable manner on the pulling element 7, i.e. the wire. In practice, in most cases the carrier elements are fixed to the wire, as is the case in the shown examples, but they may in principle be allowed to be rotatably arranged around the wire, which then becomes the axis of rotation. The purpose of the fastening is that the carrier elements shall maintain a predetermined relative distance in order to make possible a maximum flexibility of the conveyor chain and to give a correct shape engagement for both load-carriers, as well as for driving wheels in the driving devices for operation of the conveyor chain. In fact, a space is necessary for most types of carriers, since otherwise great tensions arise during deflection of the conveyor chain.

Figure 3:
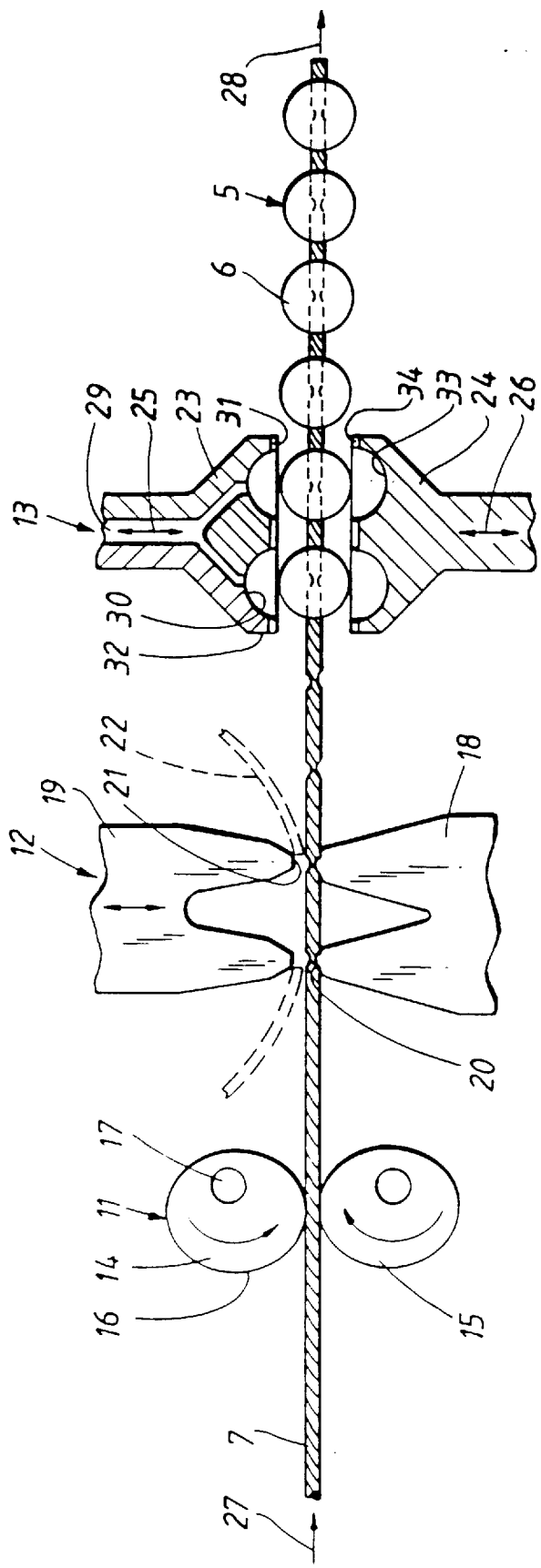
FIG. 3 shows a device for production of a conveyor chain, which in principle may be used for different alternative fastening methods in accordance with the invention.

FIG. 3 shows schematically a general example of a device for production of a conveyor chain, including fastening of the carrier to the wire. In accordance with the invention, the carrier elements 6 are injection moulded directly onto the wire 7, which wire is arranged with a shape and/or cross-sectional dimension which varies along the length of the wire. The device consists of a feeding device 11 for the pulling element, i.e. the wire 7, a device 12 for altering the wire and an injection moulding device 13 for injection moulding of carriers 6, which in the shown example are rotationally symmetrical or, more precisely, spherical. In the shown example, the feeding device 11 is composed of feeding wheels arranged in pairs, one upper and one lower wheel 14, 15 which for example are formed as rope wheels and which are adapted to feed the wire step by step in steps which correspond to at least a centre distance between two carrier elements or a multiple thereof. In the shown example, the feeding is carried out in steps corresponding to twice the centre distance between the carrier elements, due to the fact that the device for alteration of the wire 12 and the injection moulding device 13 are doubled, i.e. that production and fastening are carried out simultaneously for two carrier elements at a time which are fastened tightly by means of shrinking. In the shown example, the stepwise feeding is carried out by feeding the mantle surface 16 of the feeding wheels 14, 15 periodically against the wire 7 under rotation so that it is squeezed between the feeding wheels during a feeding cycle, after which the mantle surfaces are returned to form a space which is greater than the cross-sectional dimension of the wire, by means of which the feeding is interrupted and is replaced by working operations. This is illustrated in an easy and schematical manner in the shown example by the feeding wheels being oval, i.e. they are not rotationally symmetrical and furthermore are also eccentrically arranged about an axis of rotation 17. The upper feeding wheel rotates counterclockwise, whereas the lower wheel rotates clockwise.

In the example shown in FIG. 3, the device 12 for alteration of the wire is composed of a fixed backing part 18 and an impact part 19. The backing part 18 consists of two backing elements 20 which are arranged at a relative distance which is equal to the centre distance between two carrier elements, which in the following and for reasons of simplicity are referred to as balls. The backing elements 20 present a suitable profile for obtaining a deformation of the wire. In a corresponding manner, the impact part 19 presents two impact means 21 arranged at a corresponding interval, which means also have a suitable profile shape in order to obtain a distinct deformation of the wire from opposite sides together with the impact means. In order to make possible a special alteration of the wire of a kind which is described in greater detail below, feeding paths 22 are arranged and are indicated with broken lines, which paths extend to a position immediately in front of each of the impact organs 21 for feeding fastening elements in the form of pins, fastening brackets or the like. The guides may be formed by tubular elements or bars which form guides for fastening elements. They are either fixed and are arranged with their ends very close to the impact position or they are flexible and attached to the impact means of the impact part 19.

The injection moulding device 13 consists of an upper and a lower mould half 23, 24, which are both adapted to be brought towards and away from, respectively, the wire in the direction of the arrows 25, 26, i.e. across the longitudinal direction of the wire which is equal to its feeding direction, i.e. the direction of the arrows 27, 28. These movements are synchronized with the feeding of the wire, so that the mould halves are fed towards and away from the wire, respectively, while the wire stands still, i.e. during the working operation. However, they maintain the withdrawn position while the wire is stepped in a forwards direction, i.e. during the feeding phase. The injection moulding device 13 presents not shown conventional parts for an optional mixing of plastics components to a suitable composition and melting of plastics components, for example from granular material to a liquid plastics compound, which is fed to a channel 29 in one of the mould halves 23 and is branched into two mould cavities 30 which present the form of half a carrier element, i.e. a half sphere in the shown example. Furthermore, the mould constitutes half the cross-sectional shape of the pulling element 7 in the form of a half cylindrical through-channel 31. The channel connects the two half spheres and also extends to the outer edge 32 of the mould half 23 on both sides of the mould half. The lower mould half has a corresponding shape as regards the cavities, but does not necessarily include a separate channel for supply of a plastics compound; instead the mould can be filled solely from the upper mould half.

Figure 2:
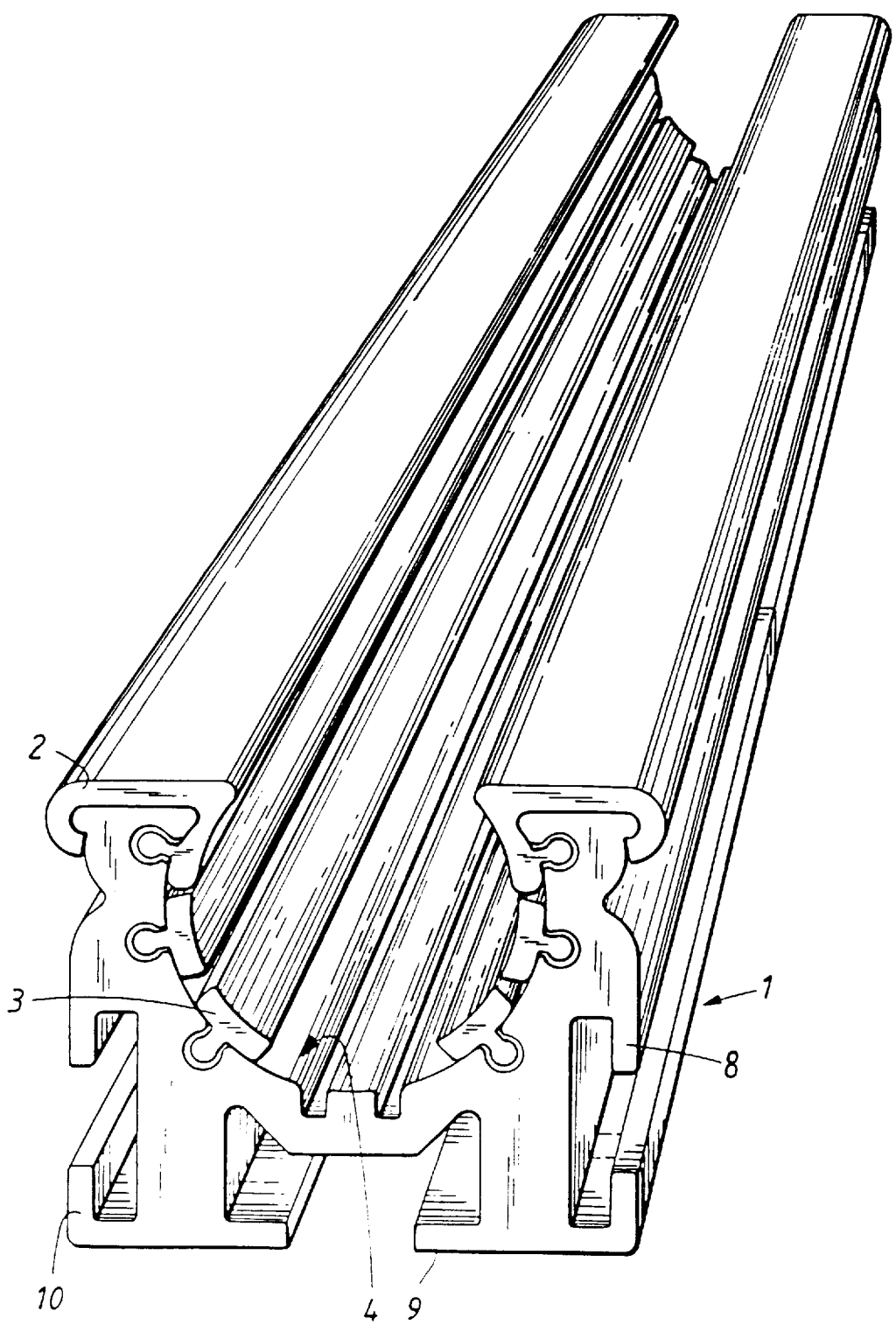
FIG. 2 shows a perspective view of the guiding device.

To sum up, the production of the conveyor chain according to the present invention is carried out as follows. Initially, there is provided a ready-made component in the form of the pulling element 7, i.e. the wire which is fed, preferably in a continuous length, by means of the feeding device 11. This device is suitably supplemented with a not shown pulling device which is arranged in the rear end of the production device and which is formed by, for example, an engine-powered drum for winding up the finished conveyor chain after cooling of the carrier elements. When the feeding device 11 is kept in a non-operative position, i.e. when the pulling element 7 stands still and rests on the backing device 18, the feeding operation is converted into the working operation, wherein the impact device 19 in the device 12 for altering the wire is activated, and is fed quickly by means of a not shown driving device, for example a pneumatic or a hydraulic piston cylinder, an electric-engine driven eccentric disc or the like. By punching with the impact means 21 at two locations on the wire at an interval corresponding to the distance between two ball centres and with the backing means 20 on the opposite side of the wire, the wire will be deformed and in this regard it will also be slightly flattened. This is possible without radically changing the strength in the wire, through the fact that the wire is composed of a large number of twisted steel wires, strands, which are slightly bent so that the wire simultaneously receives a local deflection at both sides, as seen from above, i.e. from the impact part 19. In FIG. 1, the shape of the wire after alteration of the shape, which takes place in a section which is situated essentially in the centre of the ball 6, is indicated with broken lines. The cross-section through the wire in FIG. 1 is placed somewhere between two balls.

The injection moulding device 13 is activated simultaneously with the alteration of the wire, i.e. during the working operation when the wire 7 is standing still, by bringing the two mould halves 23, 24 forward towards the wire by means of a not shown driving device, hydraulic or pneumatic piston cylinders, electric-engine driven eccentric device or the like, so that the plane separating surfaces 34 of the mould halves reach a sealing contact against each other. In this regard, a sealing fit is accomplished around the wire which extends through the cavities 30, 33 and two closed cavities determining the shape of the carrier elements 6 are formed. At the same time, the plastics compound is supplied under pressure via the supply channel 25 during simultaneous evacuation of air contained in the mould cavities in a manner known per se. The plastics compound thereby fills the mould cavities completely and is thus arranged around the wire which extends centrally and symmetrically through the mould cavities, the plastics compound being arranged entirely tight-fitting around the surface of the wire and filling up every irregularity thereof. This means that the wire will extend along a through space in every ball, which space has a dimension and a shape which is practically identical with a negative mould of the mantle surface of the wire with the shape it has in its section which extends through every ball. This means that the local change in shape which has been achieved by means of the device 12 for alteration of the wire gives a corresponding negative shape in said space and thus assures a non-sliding fastening of the ball on the wire through the fact that said space becomes non-homogenous along its extention in the longitudinal direction of the wire. Both the wire as well as the space thus obtain a varying cross-sectional shape and cross-sectional dimension along the extension of the wire through the ball. This leads to the forming of engagement surfaces through which both frictional and shape engagement with the mantle surface of the wire are obtained, which assures its fastening. The engagement is assured through shrinking of the ball on the wire.

After a completed working operation, i.e. a change in shape by means of the wire alteration device 12 and injection moulding by means of the injection moulding device 13, the two devices are activated in order to be returned in a direction across the longitudinal direction of the wire to the position which is shown in FIG. 3. Thereafter, the feeding device 11 can be activated once again to engage the wire to advance it one step forwards, which in the shown example is equal to two ball distances. Thereafter, the wire 7 is stopped, after which a new working operation starts, which results in that balls are gradually produced which are fixed on the wire at certain intervals and which are post-treated in a manner which is known per se, such as cooling, hardening etc., before the wire with the fastened balls may be gathered, for example on a drum, or may fall down into a collecting container after passing of a suitable pulling device.

Figure 4:
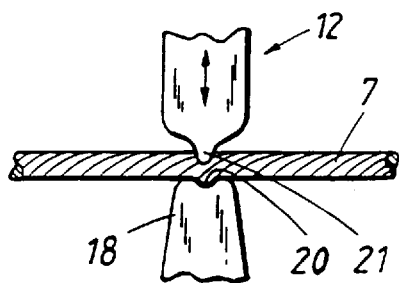
FIGS. 4–7 show in greater detail different devices and methods for fastening the carrier elements on pulling elements.

FIG. 4 shows a detailed view of the device 12 for altering the wire, which can represent an alternative embodiment with a slightly different form of the impact means 21 and the backing means 20. In this case, the impact means 21 is slightly more pointed, but preferably it has a greater width perpendicular to the longitudinal direction of the wire, i.e. it may advantageously be shaped as a wide, rounded chisel in order to allow certain lateral movements of the wire. In a similar manner, the backing means 18 is preferably of at least the same width, but is shaped with a corresponding recess, by means of which the wire is slightly upset at each position for the altering of the wire. The device 12 may be composed of one single impact means in order to achieve a alteration of the wire with intervals which are equal to the ball distance, but may also in this case be composed of two or more impact means, as in the case with the device according to FIG. 3.

Figure 5:
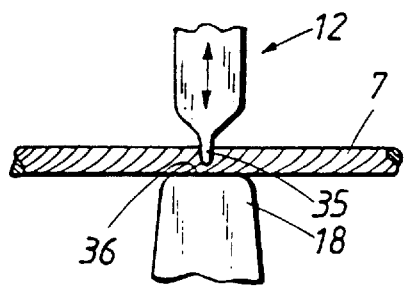

FIG. 5 shows an alternative embodiment of the device for altering the wire in which the impact means, here denoted by 35, is more pointed around all sides and is also adapted to penetrate the wire in order to splice it. The backing part 18 can either be planar and preferably slightly non-rigid in order to allow the penetration of the impact means, or may alternatively be provided with a corresponding recess for receiving the impact means. It is also possible that the movement of the impact means is adapted in such a way so that the impact means more or less penetrates to a depth which is shown in FIG. 5, by means of which the impact means, which is here denoted with 36, may be entirely planar. By means of this alternative embodiment, a local change in the shape and dimensional change of the cross-section of the wire is obtained, which assures a fastening of the moulded-on ball.

Figure 6:
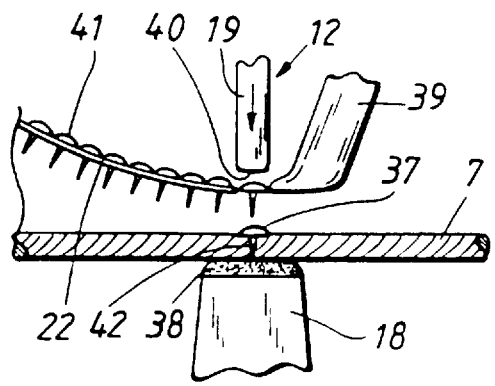

FIG. 6 shows a further embodiment of the device 12 for altering the wire, which in this case is supplemented with the driving in of a pin 37 for each fastening position. The device is provided with the path 22 which is indicated in FIG. 3, along whose extension a line of pins is fed in a manner which is known per se and to a position above the wire and the backing part 18, which is preferably provided with a relatively stiff elastic cushion 38 which allows a certain penetration of the pin in the case where it extends slightly through the cross-section of the wire. Furthermore, an end stop 39 for the fed pin is provided, which pin is thereby kept in a position at which it is ready for punching by means of the impact part 19, the end 40 of which has a suitable form, for example planar, in order to impact the head of the pin 41. This fastening device assures both a certain change in shape (expansion) of the wire through the fact that the pointed part 42 of the pin penetrates the wire and, through its demand for space, forces aside the wire strands and also forms a raised section above the normal profile of the wire with the head 37 which gives a shape engagement with the moulded-on ball.

Figure 7:
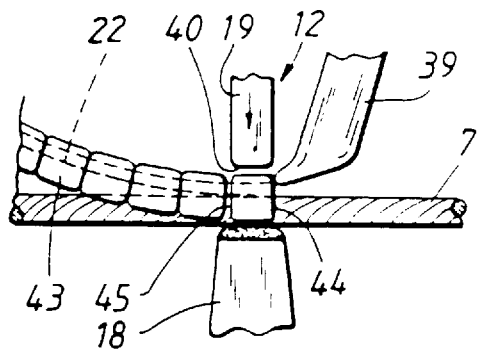

FIG. 7 shows a further alternative for the altering of the wire in which the impact part 19 and the backing part 18 can be of the same type as in the embodiment according to FIG. 6. Also in this case a path 22 is provided, which is adapted for making possible feeding in line of essentially U-shaped fastening brackets 43, where the front bracket at each occasion is held in position by the end stop 39 and where the path 22 is shaped in a suitable manner so that it is held in position above the backing part 18, but so that it allows the bracket to be forced down and about the wire by means of the impact part 19. Not shown holding jaws, which move forwards and backwards, may be provided, which jaws move across the plane of the paper. These holding jaws can also serve as supplementing impact means which squeeze together the brackets 43 from the side from two opposite directions and squeeze together the brackets one at a time around the wire at each fastening position at intervals which are equal to the ball distance, i.e. the centre distance between two adjacent balls. Alternatively, the impact part 19 in its impact means 40 may be constructed so that this squeezing together is obtained. Punching of the wire with sheet metal brackets is known per se in other fields, for example for forming loops or for joining wires. Consequently, the device should not need any further detailed description.

By mounting brackets an altered shape of the wire is obtained also in this case. This is obtained at each fastening position so that the bracket in itself forms a "thickened" portion with edge surfaces 44, 45 which give a form engagement against the corresponding edge surfaces which have been obtained in the "cavity" in the ball, which thus is filled by both the wire and the bracket 43. In a mounted state, the bracket may generally have the shape of a cylinder or a part of a cylinder, alternatively more angular, for example U-shaped with diminished dimensions in relation to the original dimension of the bracket.

Figure 8:
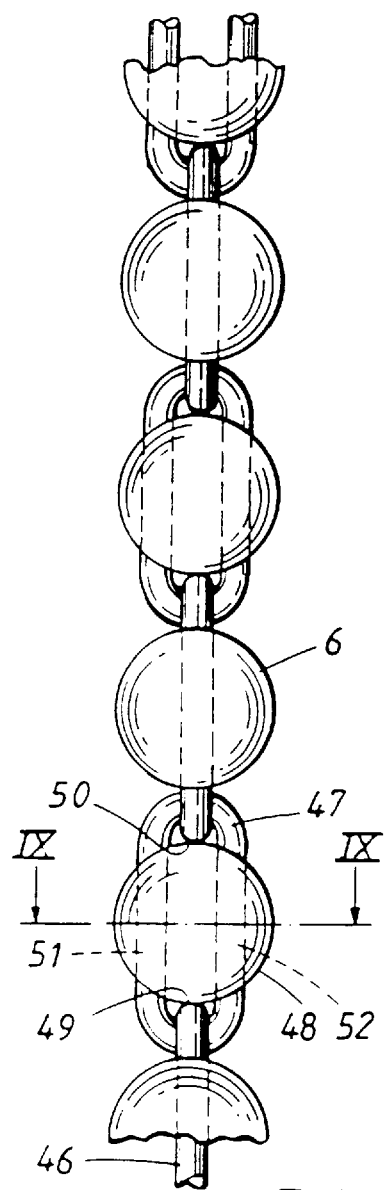
FIGS. 8 & 9 show a further method for obtaining a fastening of carrier elements on pulling elements.
Figure 9:
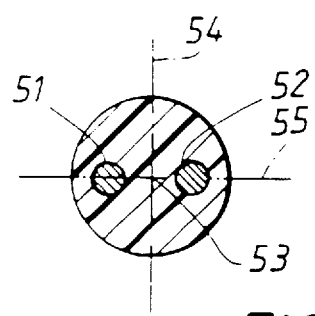
Figure 10:
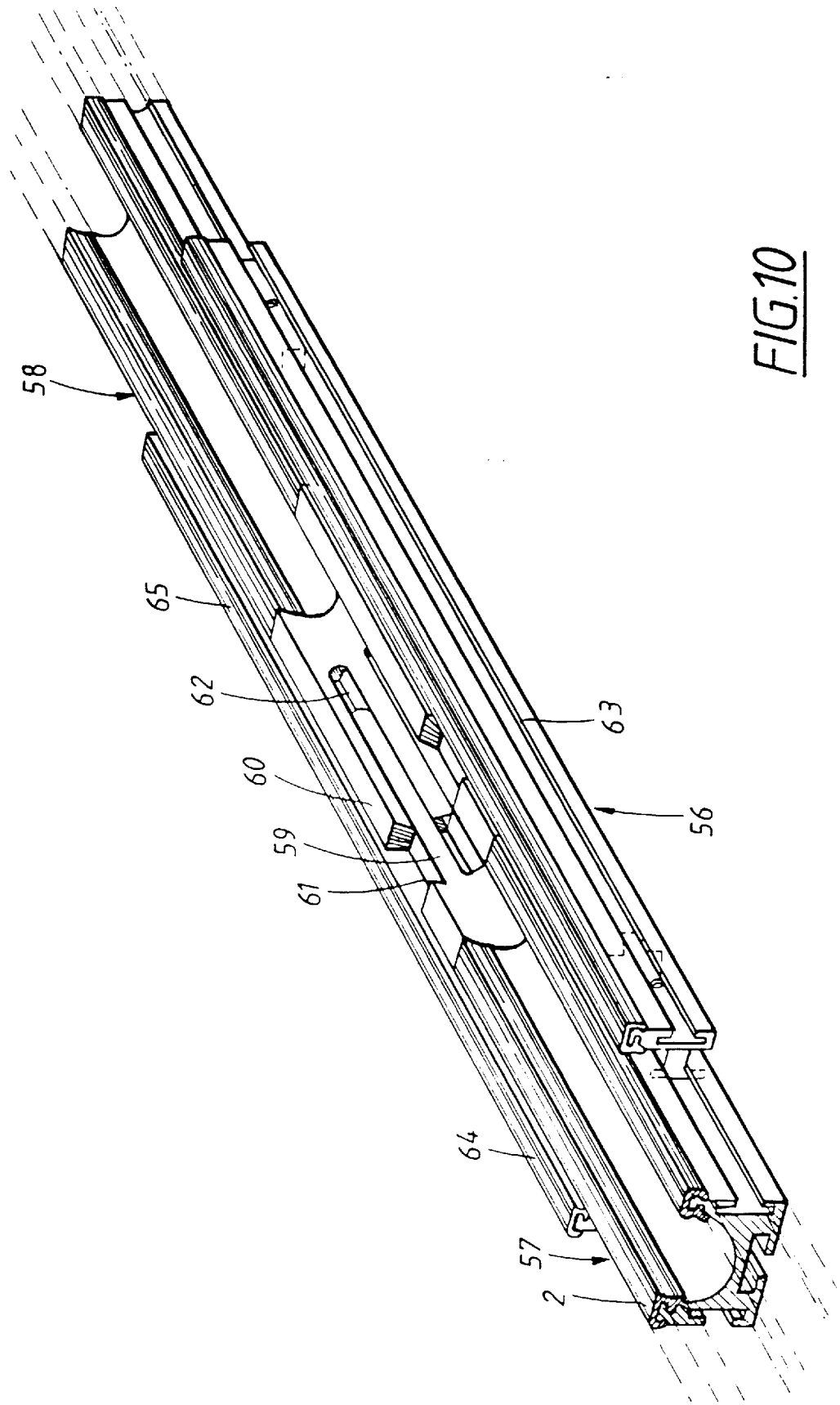
FIGS. 10–13 show perspective views of a wire tensioning device forming part of the carrier device according to the invention.

FIGS. 8 and 9 show, in a partly broken view from above and a cross-section through a ball, an alternative solution to the fastening which is based on the fact that the pulling part, which is denoted by 46, is given a change in form and dimension at different cross-sections by means of the fact that a chain with several chain links 47 is chosen as a pulling part. In this regard, the device 12 for altering the wire is omitted from the device according to FIG. 3, wherein the position of the pulling part in relation to the injection moulding device 13 is accurately adjusted so that the balls 6 are injection moulded on each separate link in the case where each link is given a dimension which exceeds the diameter of the ball. In this case the diameter is adapted so that the ball is kept in position in a manner which does not allow any sliding or turning in relation to the chain 46 due to the fact that the circumference of the ball 48 reaches the end surfaces 49, 50 of the previous and following link, respectively. This is actually not necessary in those cases where the links are formed so that their two shanks 51, 52 are not straight or parallel but may converge, alternatively extend in an arc, by means of which a complete locking of the ball on each link is obtained by means of the fact that the shanks are situated at different distances from the centre of the ball, along different cross-sections in the ball. In FIG. 9 it is indicated that the shanks in the shown example extend symmetrically on each side of the centre axis of the ball, which in this case extends across the plane of the paper through the crossing point 53 of two crossed axes of symmetry 54, 55.

In order to allow the conveyor chain to run with maximum evenness and minimum friction, the guiding device is provided at at least one position in each loop with a special section which forms a so called wire tensioner, which strives to maintain the loop of the guiding device at a length which is optimally adapted to the conveyor chain. In this manner, the conveyor chain is kept slightly stretched with a suitably adapted stretching force, due to which the risk for pinching and similar effects which increase friction is avoided. The wire-tensioner is shown in an embodiment in FIGS. 10, 11, 12 and 13 and is in principle composed of two guiding parts 57, 58 which mesh and which thus form an integrated part of the profile beam, but present finger-like protrusions 59 which are fixed in respective guiding parts and engage in corresponding tracks 61, 62 in the second guiding part. In this manner, the sliding surface of the profile beams is bridged or overlapped in an unbroken fashion irrespective of the mutual positions of the two guiding parts 57, 58 within a permitted expansion area. The two guiding parts are guided by means of the protrusions in the corresponding tracks as well as by means of two guide profiles 63, 64 which are fixed to a not shown console. Corresponding consoles are arranged at several places along the path so that the profile beam may be carried everywhere in a way so that a certain mobility is allowed in order to avoid tensions in the different profile beam sections. Since the two guiding parts 57, 58 in turn are fixed with the other sections of the path, the mutual movements thereof must be absorbed essentially by connected profile beam sections. On the top side of the guide profiles 63, 64 in the shown example, slide strips 65 are provided which are arranged at the same height as the upper slide element 2 of the profile element. Advantageously, the two guiding parts 57, 58 are also provided with additional guiding strips which form a guide for the conveyor chain. These guiding strips can either be separate, exchangable slide strips or strips formed of the profile beam's own material, preferably aluminium or some alloy thereof.

Figure 11:
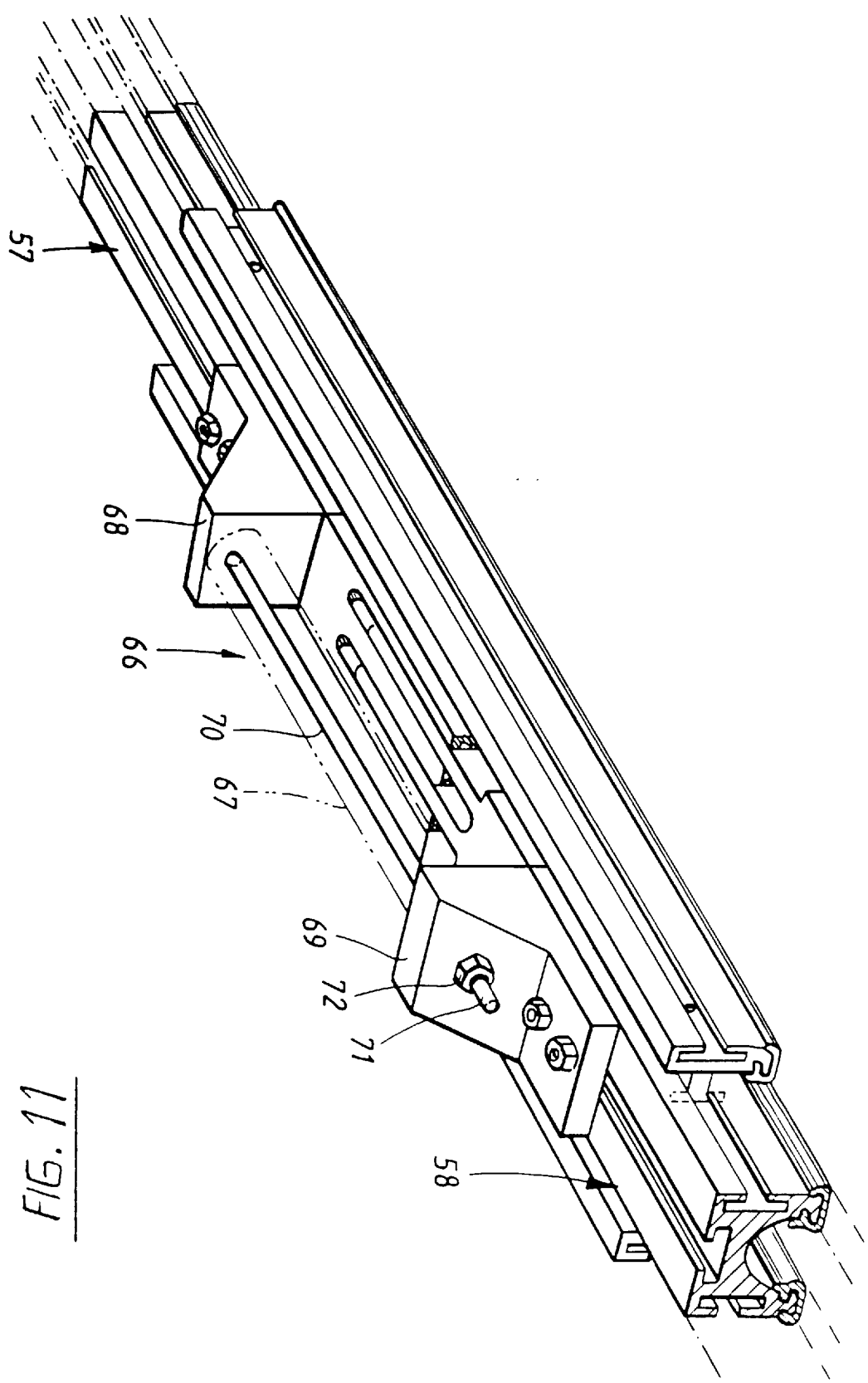
Figure 12:
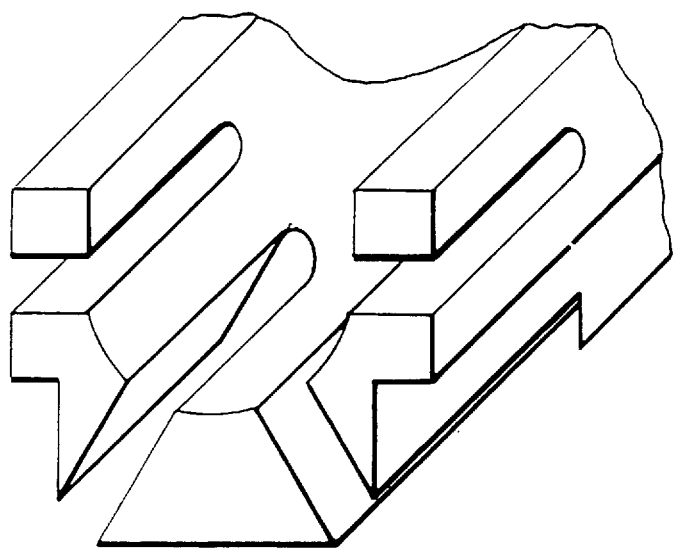
Figure 13:
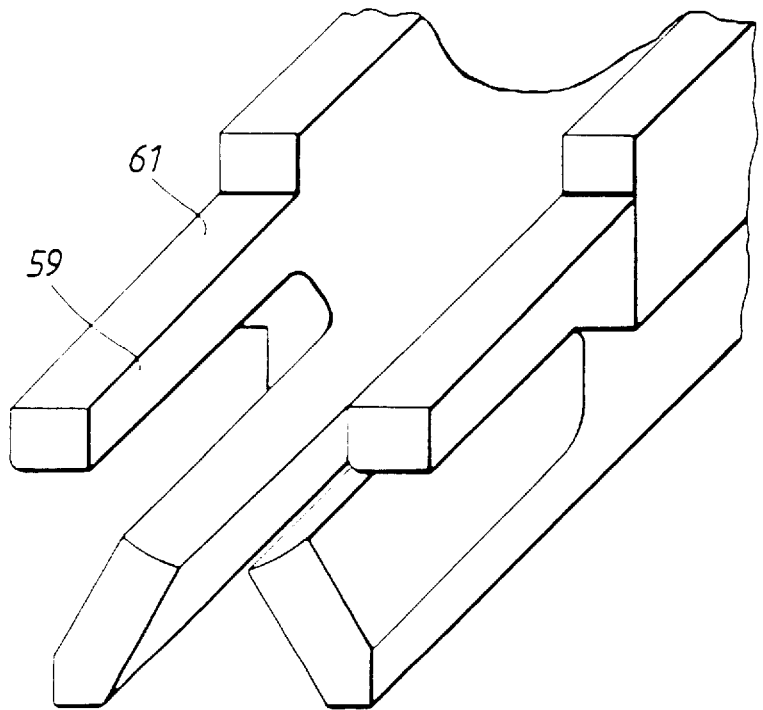

Besides being movable in relation to one another, the two guiding parts 57, 58 are also biased so that they strive to be separated from one another when a spring force is present so that each tensioner 56 expands as a whole, i.e. increases its length. To this end, and as is illustrated in FIG. 11, a tensioning device 66 is arranged on the bottom side of each tensioner in the form of a power device 67, in the shown example a pushing spring which is clamped between two brackets 68 which are arranged in a respective guiding part 57, 58, the relative position between the guiding parts 57, 58 being controlled by means of a control rod 70 which extends through the centre of the pushing rod 67 and through holes in the respective console 68, 69. The control rod 70 presents threaded end sections 71 with a nut 72 on the outside of each console, by means of which the wire-tensioner's tensioning of the wire may be controlled. The power device may alternatively be a pneumatic unit.

The invention is not limited to the embodiments described above and shown in the drawings, but may be varied within the scope of the appended claims. For example, other forms of pulling parts than shape-altered wires or chains may be chosen in order to obtain a cross-sectional form and/or cross-sectional dimension which varies along the length of the pulling part. The carrier elements may be formed in different ways in order to carry load-carriers. The load-carriers can be formed by wings, plates or the like which may be snapped or screwed on. In certain cases it is sufficient with pushing elements in the form of edges, pins or the like. Hanging carriages may be conveyed forwards with shape engagement with the carrier element. The guiding device may be turned in order to carry hanging load-carriers or loads hanging from for example hooks. Furthermore, it is possible that the first type of slide elements 3 is fewer in number, for example two (one on each side) or more and has a slide element at the bottom of the channel. Furthermore, the first and the second type of slide elements 3, 2 may possibly be integrated and connected on the respective sides. The other type of slide element may possibly be designed without a snap part 22 and thus without the third surface section 21.

I claim:

1. A guiding device for a conveyor chain for the transport of objects adapted to be carried by load-carriers which are connected or connectable to said conveyor chain, wherein said conveyor chain is formed by a plurality of carrier elements arranged in a row and connection means adapted to connect said carrier elements to each other so that said chain may be deflected simultaneously both vertically and laterally, said guiding device comprising a channel including grooves in which said conveyor chain is intended to run and an inwardly facing sliding surface for guiding said conveyor chain, said inwardly facing sliding surface adapted to the cross-sectional shape of said carrier elements, said guiding device further including a profile beam enclosing said channel, said profile beam including a longitudinal slot opening outwardly whereby said load-carriers connected to said conveyor chain are carried thereby, said inwardly facing sliding surface comprising a plurality of slide elements including strip protrusions extending into said grooves in said channel.

2. The guiding device of claim 1 wherein said plurality of slide elements include at least one upper slide element which extends around an edge section of said profile beam, said upper slide element including a first surface section which presents an inwardly facing sliding surface and a second surface section which presents an outwardly facing sliding surface for load-carriers or goods being transported by said conveyor chain.

3. The guiding device of claim 2 wherein said at least one upper slide element further includes a third surface section which extends laterally from said second surface section and presents a sliding surface for hanging load-carriers.

4. The guiding device of claim 1 wherein said profile beam further includes at least one collecting groove at the bottom of said channel for draining and gathering foreign particles, said collecting groove provided with draining holes along the bottom surface thereof.

5. A conveyor comprising a guiding device and a conveyor chain for the transport of objects along a path, wherein said objects are adapted to be carried by load-carriers which are connected or connectable to said conveyor chain, said conveyor chain forming a closed, endless loop which is operated by means of a driving device, said conveyor chain comprising a plurality of carrier elements arranged in a row and connection means in the form of a pulling element connecting said plurality of carrier elements to each other so that said chain can be deflected simultaneously both vertically and laterally, said guiding device comprising a channel in which said conveyor chain is intended to run and an inwardly facing sliding surface for guiding said conveyor chain, said inwardly facing sliding surface adapted to the outer circumference of said carrier elements, said guiding device further including a profile beam enclosing said channel, said profile beam including a longitudinal slot opening outwardly whereby said load-carriers connected to said conveyor chain are carried thereby, said pulling element including a plurality of fastening elements for said carrier elements arranged at predetermined intervals thereon, said fastening elements comprising variations in the cross-section of said pulling element, and said carrier elements having an inner surface which corresponds to said cross-section of said pulling element, whereby said carrier elements are closely fastened to said pulling element along the length thereof.

6. The conveyor of claim 5 wherein said pulling element comprises an element selected from the group consisting of a wire, cord or chain, and said fastening elements comprise deformations of said pulling element at said predetermined intervals therealong.

7. The conveyor of claim 5 wherein said fastening elements comprise a plurality of pins driven transversely through said pulling element.

8. The conveyor of claim 5 wherein said fastening elements comprise brackets wrapped around said pulling element.

9. The conveyor of claim 5 wherein said pulling element comprises a chain, and said fastening elements are formed by a continuous, regular variation in the form and dimension of said pulling element.

10. A conveyor comprising a guiding device and a conveyor chain for the transport of objects along a path, wherein said objects are adapted to be carried by load-carriers which are connected to or connectable with said conveyor chain, said conveyor chain forming a closed, endless loop which is operated by means of a driving device, said conveyor chain comprising a plurality of carrier elements arranged in a row and connection means in the form of a pulling element connecting said plurality of carrier elements to each other so that said chain can simultaneously be deflected both vertically and laterally, said guiding device comprising a channel in which said conveyor chain is intended to run and an inwardly facing sliding surface for guiding said conveyor chain, said inwardly facing sliding surface adapted to the outer circumference of said carrier elements, said guiding device further including a profile beam enclosing said channel, said profile beam including a longitudinal slot opening outwardly whereby said load-carriers connected to said conveyor chain are carried thereby, said profile beam comprising an adjustable tensioning device along at least a section of said guiding device, whereby said adjustable tensioning device controls the length of said guiding device, said adjustable tensioning device comprising a first guide and a second guide meshing with said first guide to form an integrated part of said profile beam, one of said first and second guides including finger-like protrusions and the other of said first and second guides including corresponding tracks for engaging said finger-like protrusions.

11. The conveyor of claim 10 wherein said first and second guides are positionally adjustable in relation to each other, and including a power device for biasing said first and second guides.

* * * * *

UNITED STATES PATENT AND TRADEMARK OFFICE
CERTIFICATE OF CORRECTION

PATENT NO. : 5,857,560
DATED : January 12, 1999
INVENTOR(S) : Björkholm

It is certified that error appears in the above-identified patent and that said Letters Patent is hereby corrected as shown below:

Title page, item [76] "Brähult" should read --Bramhult--.

Column 3, line 28, after "essentially" insert -- = --.

Signed and Sealed this

Eighteenth Day of May, 1999

Attest:

Q. TODD DICKINSON

*Attesting Officer*     *Acting Commissioner of Patents and Trademarks*